US009043310B2

(12) United States Patent
Liu et al.

(10) Patent No.: US 9,043,310 B2
(45) Date of Patent: May 26, 2015

(54) ACCESSING A DIMENSIONAL DATA MODEL WHEN PROCESSING A QUERY

(75) Inventors: Shaorong Liu, Evanston, IL (US); David C. Sharpe, Oakville, CA (US); Chi Man J. Sizto, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 13/291,566

(22) Filed: Nov. 8, 2011

(65) Prior Publication Data

US 2013/0117255 A1 May 9, 2013

(51) Int. Cl.
*G06F 17/30* (2006.01)

(52) U.S. Cl.
CPC .... *G06F 17/30592* (2013.01); *G06F 17/30498* (2013.01)

(58) Field of Classification Search
CPC ....................................................... G06F 17/30
USPC .......................................................... 707/714
See application file for complete search history.

(56) References Cited

U.S. PATENT DOCUMENTS

| | | | |
|---|---|---|---|
| 6,374,235 B1 | 4/2002 | Chen et al. | |
| 6,397,204 B1 | 5/2002 | Liu et al. | |
| 6,446,063 B1 | 9/2002 | Chen et al. | |
| 7,085,751 B2 | 8/2006 | Finlay et al. | |
| 2007/0233648 A1 | 10/2007 | Zuzarte | |
| 2008/0059420 A1 | 3/2008 | Hsu et al. | |
| 2010/0306591 A1 | 12/2010 | Krishna | |
| 2013/0110819 A1 * | 5/2013 | Attaluri et al. | 707/714 |

* cited by examiner

*Primary Examiner* — Syling Yen
*Assistant Examiner* — Johnese Johnson
(74) *Attorney, Agent, or Firm* — Patterson & Sheridan, LLP

(57) ABSTRACT

Techniques are disclosed for accessing a dimensional data model when processing a query. In one embodiment, the query is processed by performing a two-stage zigzag join operation including a zigzag main join and a zigzag back join. The zigzag main join is configured to generate a set of row identifiers of fact records satisfying any local predicates in the query. The zigzag back join is configured to generate query results based on the set of row identifiers. The query results are returned responsive to the query.

20 Claims, 10 Drawing Sheets

300

FACT TABLE 162

| UNITS_SOLD (202) | TID (204) | GID (206) | PID (208) |
|---|---|---|---|
| 10 | 2/15/2006 | Atlanta | Belt |
| 30 | 2/15/2006 | Atlanta | Jacket |
| 41 | 2/15/2006 | Atlanta | Jeans |
| 3 | 2/15/2006 | Atlanta | Sunglasses |
| 8 | 2/15/2006 | Boston | Jacket |
| 12 | 2/15/2006 | Boston | Jeans |
| 27 | 2/15/2006 | Boston | T-Shirt |
| 16 | 2/15/2006 | San Francisco | Belt |
| 9 | 2/15/2006 | San Francisco | Sunglasses |
| . . . | . . . | . . . | . . . |
| 6 | 2/15/2006 | St. Louis | T-Shirt |

JOINT RESULT RECORD 302 (row: 3, 2/15/2006, Atlanta, Sunglasses)

FEEDBACK RECORD 304 (row: 8, 2/15/2006, Boston, Jacket)

FEEDBACK RECORD 306 (row: 16, 2/15/2006, San Francisco, Belt)

FIG. 3

(BEFORE SORT)

(AFTER SORT)

(INDEX INCLUDING PAYLOADS)

(INDEX NOT INCLUDING PAYLOADS)

ACCESSING A DIMENSIONAL DATA MODEL WHEN PROCESSING A QUERY

BACKGROUND

Databases are computerized information storage and retrieval systems. A relational database management system is a computer database management system (DBMS) that uses relational techniques for storing and retrieving data. An object-oriented programming database is a database that is congruent with the data defined in object classes and subclasses.

Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests are often made using high-level query languages such as Structured Query Language (SQL). Upon receiving such a request, the DBMS may execute the request against a corresponding database, and return any result of the execution to the requesting entity.

SUMMARY

Embodiments of the invention provide a method, product and system for performing an operation for processing a query against a dimensional data model, the dimensional data model comprising a fact table and a plurality of dimension tables. The operation includes determining, from each dimension table, a respective set of dimension records satisfying any local predicates in the query pertaining to the respective dimension table. The operation also includes, based on the sets of dimension records, identifying, from the fact table, a set of row identifiers of fact records satisfying any join predicates and local predicates in the query. The row identifier of each fact record is identified by joining a respective, distinct, concatenated dimension record to the fact table and applying any local predicates to the fact table. Each concatenated dimension record is generated by concatenating a join key value from each set of dimension records. Further, the join key values for generating at least a first concatenated dimension record are determined based on a feedback record. The feedback record includes at least a portion of a next ordered fact record succeeding a previously identified fact record. The operation also includes generating query results responsive to the query by joining, to the sets of dimension records, one or more fact records in the fact table selected based on the row identifiers.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 3 illustrates records stored in the fact table, according to one embodiment of the invention.

DETAILED DESCRIPTION

Figure 1:
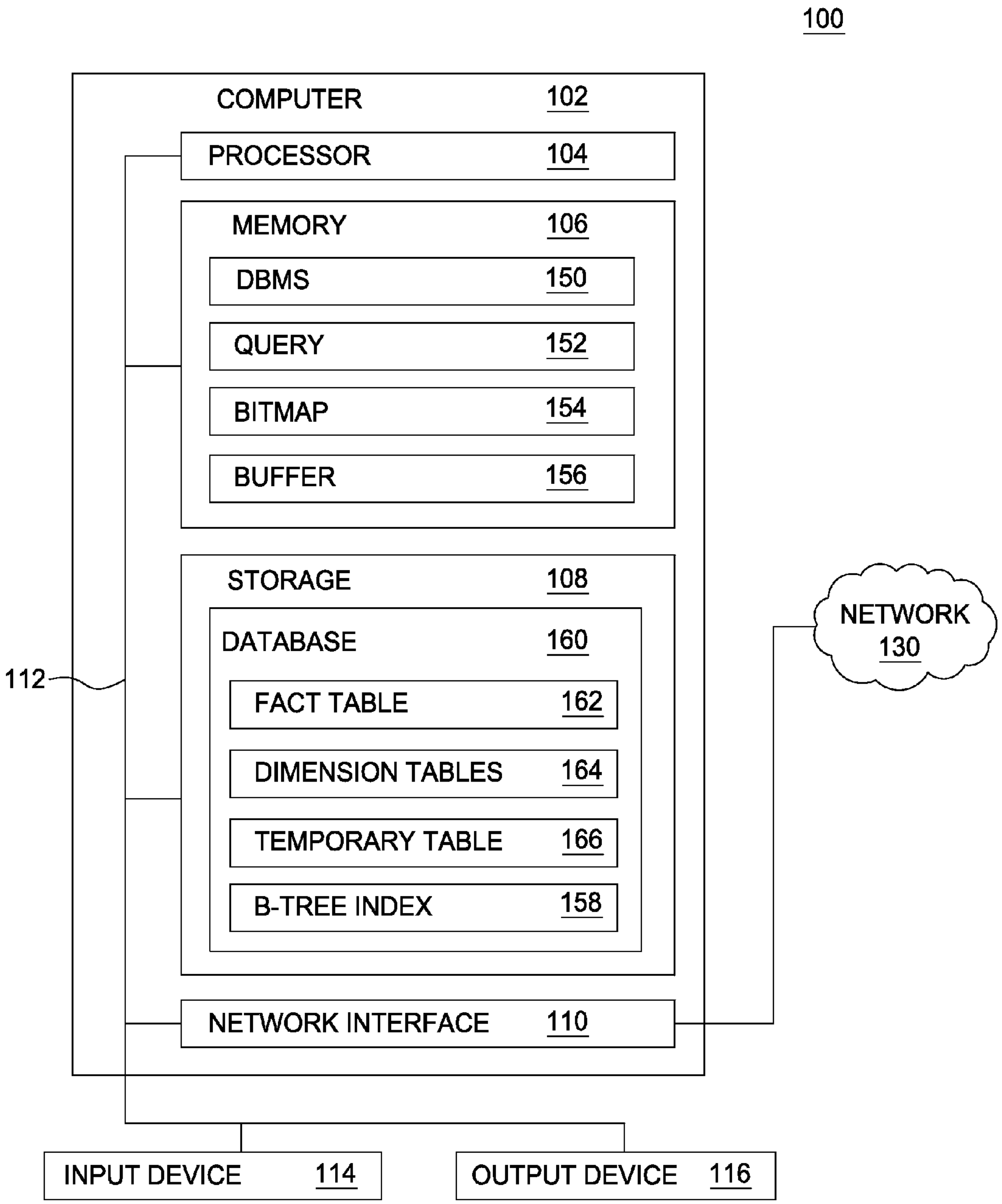
FIG. 1 is a block diagram illustrating a system for accessing a dimensional data model when processing a query, according to one embodiment of the invention.

Embodiments of the invention provide techniques for accessing a dimensional data model when processing a query, which may contain one or more predicates. Each predicate may be a local predicate or a join predicate. A local predicate references a single table, restricting the number of rows returned for the single table. A join predicate, on the other hand, references two or more tables and specifies a manner in which to join rows from the two or more tables. In one embodiment, an application is provided that is configured to receive the query from a requesting entity, such as a user or an application. At least in some embodiments, the application is a database management system (DBMS) or a query engine component thereof. The application performs a filtering operation to determine, for each dimension table, a set of dimension records satisfying any local predicates specified in the query and that pertain to the dimension table. The application performs a buffering operation to facilitate sorted, random access to data in the sets of dimension records. In one embodiment, the application then performs a two-stage join operation that includes a main join and a back join.

In one embodiment, the main join is configured to generate a set of row identifiers of fact records satisfying any join predicates among the fact table and the dimension tables and any local predicates pertaining to the fact table. The application then sorts this set of row identifiers into an order, fetches the fact table records in the order of the sorted row identifiers (i.e., in fact table data page order) and applies the back join as a filtering operation on the data page of the fact record. The back join re-qualifies fact table records to account for any updates that may have occurred in the fact table and retrieves any dimension payload columns specified by the query, to form query results responsive to the query. The application then returns the query results to the requesting entity. Because the back join retrieves fact table data in the data page order, the application may access the fact table efficiently. Also, applying the back join is on a fact table data page layer allows consuming pushdown to be used, further improving efficiency of accessing the fact table. Further, because retrieval of dimension payload columns is deferred until the back join, the application may access the dimension tables efficiently. Accordingly, the application access fact and/or dimension data—and hence process queries—more efficiently in terms of time and/or resources, relative to other approaches also discussed herein.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a DBMS) or related data available in the cloud. For example, the DBMS could execute on a computing system in the cloud and provide access to one or more tables. The one or more tables may be stored at a storage location in the cloud. Doing so allows the one or more tables to be accessed from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for accessing a dimensional data model when processing a query, according to one embodiment of the invention. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As shown, the memory 106 of the computer 102 includes a database management system (DBMS) 150 configured to manage a database 160 stored in the storage 108 of the computer 102. The database 160 includes a fact table 162 and dimension tables 164. At least in some embodiments, the database 160 serves as a data warehouse or a data mart. Organizations may archive data in a data warehouse, which refers to a collection of data designed to support management decision-making A given subset of the data warehouse, often specific to a given business unit, may be referred to as a data mart. Data warehouses and data marts may often be characterized by adhering to a star schema or snowflake schema, storing much larger volumes of data than is typically stored in a database, and processing queries much more complex and/or ad-hoc than is typically processed by a database.

As described above, in one embodiment, the DBMS 150 performs a buffering operation to facilitate sorted, random access to data in the filtered sets of dimension records. During the buffering operation, the DBMS 150 may generate one or more data structures, such as, without limitation, one or more of a bitmap 154, and a buffer 156 in the memory 106 and a temporary table 166 and a B-tree index 158 in the storage 108. The buffer 156 may also be referred to herein as an in-memory buffer or an in-memory array. Operations of the DBMS 150, including the buffering operation, are further described below with reference to FIGS. 2-9.

Data records in the database 160 may generally be maintained in the form of tables, which are a collection of records all having identical columns. Each column maintains information on a particular type of data in the data records. Each table may be associated with one or more indexes. An index refers to an ordered set of pointers to records in the table based on data in one or more columns of the table. In some cases, all the information needed by a query may be found in the index, making it unnecessary to search the actual table.

Data warehouses and data marts often store a wide variety of data presenting a coherent picture of business conditions at any given point in time. One type of data warehouse schema is a multi-dimensional schema, also referred to as a star schema. In a star schema, information is classified into two groups: facts and dimensions. Facts refer to records pertaining to key transactions of the organization, such as sales data, purchase data, investment returns, etc., and the records are stored in a fact table. Dimensions maintain attributes about data the fact records and are stored in dimension tables. Each dimension table has a primary key column corresponding to a foreign key column in the fact table. Typically, the fact table is much larger than the related dimension tables.

The fact table often includes numerical facts, such as the date of a sale, cost, type of product sold, location, site of sale, etc. The dimension tables may provide attributes containing descriptive textual information pertaining to one of the fact table columns. For instance, a time dimension table can provide attributes on a date column in the fact table that describes the date of sale. The time dimension table may provide various weather conditions or events that occurred on particular dates.

The star schema provides a view of the database on dimension attributes that may be useful for analysis needs of the organization. Using the star schema, users may query on attributes in dimension tables based on search criteria, to locate records in the fact table. A query would qualify rows in the dimension tables that satisfy certain join conditions. The qualifying rows of the dimension tables have primary keys corresponding to foreign keys in the fact table. A join operation, such as an equijoin or a natural join, is then performed on the qualifying rows of the joined dimension tables and the fact table. This join results in returning fact table entries that match the rows of the joined dimension tables, i.e., fact table entries that satisfy the search criteria on the dimension tables. Accordingly, join operations may be used to query a fact table on dimension table attributes.

A join operation may be used to combine or concatenate records from different dimension tables according to a condition or predicate to determine values to apply against the fact table. The join operation is distinguished from a Cartesian product, which concatenates every record from one table with every row from another table, without regard to any condition or predicate to exclude records from the result. In contrast, during a join operation, records not satisfying the predicate or condition are excluded from the result.

The Cartesian product of the records of the dimension tables provides a data view of the entire space, i.e., Cartesian space, of every possible combination of the possible dimension table values. The join result, on the other hand, is a subset of the Cartesian space that is limited to those Cartesian space points that satisfy the join or search condition. One common type of join operation is an equijoin. An equijoin combines two rows from different tables that are equal according to a given attribute. Once the combination of all dimension table records that satisfy the search criteria is generated, the resulting records may then be applied to the fact table in an equijoin operation to locate those records in the fact table that have the same values as the rows resulting from the join on the dimension tables. Typically, the primary key columns of the dimension tables in the join result are compared against the corresponding foreign key columns in the fact table to generate the equijoin results.

In multi-dimensional analysis, it may often be desirable to form a query on attributes in the dimension tables and then locate all records in the fact table that satisfy the criteria on the dimension table attributes. To execute such a query, the DBMS may join the dimension tables on conditions specified in the search criteria. The DBMS may then equijoin the dimension tables with the fact table to produce join results that satisfy the join condition. Executing the query in such a manner, however, may be inefficient, especially in cases where the results of the join operation on the dimension tables produce numerous concatenations that do not exist in the fact table. Often, an average of only one percent or less of the concatenated results of the join operation on the dimension tables have corresponding matching entries in the fact table that would concatenate in an equijoin operation. Nevertheless, executing the query in the above-described manner would attempt to join all of the join results from the dimension tables to the fact table, even though many of those attempted joins would not produce results (as less than one percent of the concatenated results of the dimension table joins have corresponding matches in the fact table). Accordingly, numerous join operations are performed that will not yield any join result, thereby needlessly consuming input/output (I/O) operations to perform the non-matching join operations.

Figure 2:
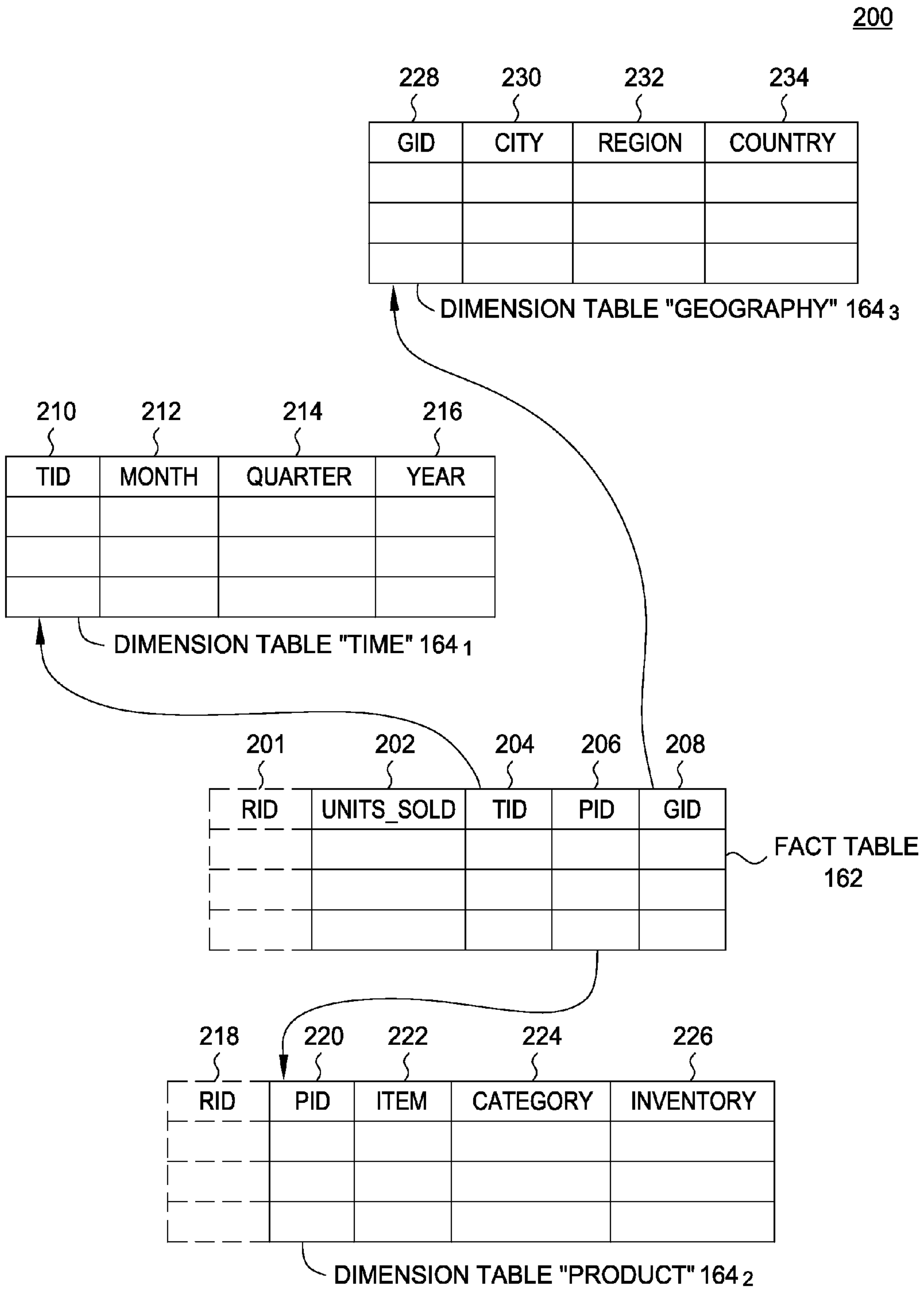
FIG. 2 illustrates a star schema that includes a fact table and dimension tables, according to one embodiment of the invention.

FIG. 2 illustrates a star schema 200 that includes the fact table 162 and dimension tables 164$_{1-3}$ of FIG. 1, according to one embodiment of the invention. Although the fact table 162 and dimension tables 164$_{1-3}$ are presented with reference to an example of storing sales data, such is not intended to be limiting of the invention, and in other embodiments, other types of data may be stored. As shown, each record in the fact table 162 includes information on the count of units sold in a Units_Sold column 202. Each record in the fact table 162 also identifies a time of sale in a TID column 204, a product sold in the PID column 206, and a sale location (such as a store location) in a GID column 208. The dimension tables 164$_{1-3}$ store attributes pertaining to the TID, PID, and GID columns 204, 206, 208.

As shown, the primary key columns of each of the dimension tables 164$_{1-3}$ are the TID column 210, the PID column 220, and the GID column 228, respectively. The columns 204, 206, 208 in the fact table 162 are foreign keys that correspond to the primary keys of the dimension tables 164$_{1-3}$ and that provide attributes pertaining to the data in the fact table 162. For instance, the dimension table 164$_1$ stores time attributes for each valid TID value, including month of the TID in column 212, quarter of the TID in column 214, and year of the TID in column 216. The dimension table 164$_2$ stores product attributes for each valid PID value, including item name of the PID in column 222, item category of the PID in column 224, and inventory location of the PID in column 226. The dimension table 164$_3$ stores geographical attributes for each valid GID value, including city of the GID in column 230, region of the GID (such as state) in column 232, and country of the GID in column 234. As such, the primary keys and foreign keys may also be referred to as the join keys of the dimension tables 164$_{1-3}$.

In one embodiment, the fact table 162 and each dimension table 164$_{1-3}$ may optionally include a surrogate key column. The surrogate key column refers to a key column that does not store any application data, which values are programmatically generated by the DBMS 150 and are not derived from application data, and that can be designated as a primary key column—in some cases in lieu of another primary key candidate, such as another column storing application data. Accordingly, the surrogate key column may store row identifiers for a given fact table or dimension table. For example, the dimension table 164$_2$ is shown to include a RID surrogate key column 218 configured to store row identifiers for the dimension table 164$_2$. Similarly, the fact table 162 is shown to include a RID surrogate key column 201 (not to be confused with the RID surrogate key column 218) configured to store row identifiers for the dimension table 164$_2$. Depending on the embodiment, if a dimension table includes both a join key and a surrogate key, either the join key or the surrogate key may be designated as a primary key for the dimension table.

One approach for locating records in the fact table 162 with a query on the attributes of the dimension tables 164$_{1-3}$ involves joining the dimension tables 164$_{1-3}$ according to conditions specified on the search criteria of the query. The join result is then equijoined with the fact table 162 to find rows in the fact table that match the attributes in the rows of the joined dimension tables 164$_{1-3}$. As described above, the number of comparisons of the records formed from the joined dimension tables could require a vast magnitude of calculations at least in some cases. For instance, if the dimension table values that satisfied the search criteria included sixty time values, fifty thousand product values, and one thousand geographical locations, then the concatenation of these rows in a join operation would produce three billion possible values to apply against the fact table 162 in an equijoin, even though likely only one percent of the entries in the fact table 162 would be concatenated in the equijoin.

FIG. 3 illustrates records 300 stored in the fact table 162 of FIG. 1, according to one embodiment of the invention. In the context of the present example, assume that the dimension table $\mathbf{164}_2$ stores five thousand distinct product values and that the dimension table $\mathbf{164}_3$ stores five hundred distinct geography values. A join on the dimension tables $\mathbf{164}_{1-3}$ for all products sold on a particular date, e.g., Feb. 15, 2006, would then include the join product of rows in TID×PID×GID that satisfy the search criteria, which includes 1*5,000*500 or 2.5 million valid points in the Cartesian space defined by the join of the rows of the dimension tables $\mathbf{164}_{1-3}$ satisfying the search criteria. As described above, many of these 2.5 million valid points may not yield equijoin results when joined to the fact table.

In one embodiment, to avoid needlessly equijoining one or more of the valid points in the Cartesian space to the fact table, the DBMS 150 identifies a feedback record in the fact table subsequent to each equijoin that is performed against the fact table. At least in one embodiment, the feedback record refers to a next ordered record succeeding one or more result records of the equijoin in the fact table or, if no records result, succeeding a position in the fact table that the records would have occupied had they existed. The criteria for selecting the feedback record may also be tailored to suit the needs of a particular case. Based on the feedback record, the DBMS 150 then identifies a next valid point in Cartesian space to be equijoined to the fact table, potentially skipping over many valid points that would not yield equijoin results. Generating equijoin results in such a manner may also be referred to as a zigzag join operation, because feedback records are used to "zig" and "zag" between a combination of dimension values and fact records. In particular, "zig" may refer to equijoining a combination of dimension values and the fact table and identifying a feedback record, and "zag" may refer to selecting a next combination of dimension values based on the feedback record, thereby potentially skipping many combinations of dimension values that are determined not to be productive to equijoin.

For example, the DBMS 150 may join a tuple of (Feb. 15, 2006, Atlanta, Sunglasses) to the fact table 162 to yield record 302 as the join result. The tuple may be generated by concatenating a key value from each of the dimension tables $\mathbf{164}_{1-3}$. The DBMS 150 may then identify a next ordered record succeeding the record 302—i.e., record 304—as the feedback record. The feedback record would then be used to determine the next point in the Cartesian space to be joined against the fact table 162—namely, the tuple of (Feb. 15, 2006, Boston, Jacket). Accordingly, the DBMS 150 avoids having to equijoin, to the fact table 162, combinations of dimension values having a TID of Feb. 15, 2006, a GID of Atlanta, and products alphabetically succeeding Sunglasses that do not exist in the fact table (e.g., T-shirt, Umbrella, etc.). The DBMS 150 also avoids having to equijoin, to the fact table 162, combinations of dimension values having a GID alphabetically between Atlanta and Boston (e.g., Austin, Baltimore, etc.).

As another example, upon receiving indication of a feedback record 306, the DBMS 150 selects, based on the feedback record, a next point in the Cartesian space to be joined against the fact table 162—i.e., a tuple of (Feb. 15, 2006, San Francisco, Belt). The DBMS 150 may thus avoid having to equijoin, to the fact table 162, any cities between Boston and San Francisco, for which no entries exist in the fact table 162. Accordingly, if there are assumed to be two hundred geographical locations alphabetically Boston and San Francisco, combinations of the geographical locations and valid products would yield a total of 200*5,000 or one million equijoins with the fact table 162. Accordingly, these one million equijoins may be avoided by using the feedback record 306. Thus, by processing the query 152 using the techniques disclosed herein, the DBMS 150 minimizes or reduces equijoining with non-existent records in the fact table 162.

A first approach for processing a query against a dimensional model may be referred to herein as a one-stage zigzag join. To perform a one-stage zigzag join, the DBMS 150 first filters records in the dimension tables 164 using query conditions in the query 152. The DBMS 150 may also store the filtered records into an in-memory data store that provides sorted, random access to the filtered records, ordered by the join key columns of the dimension tables 164. The DBMS 150 may then concatenate the first record from each dimension table to form an active concatenated record.

The DBMS 150 then enters a loop to equijoin the active concatenated record with the fact table 162 via sorted order or via index keys, to produce a set of equijoin results. After producing the set of equijoin results, the DBMS 150 may identify a feedback record succeeding the set of equijoin results in the fact table 162. As described above, if the set of equijoin results is empty, the record succeeding a location where the equijoin results would have been located in the fact table 162 had they existed is identified as the feedback record. The DBMS 150 then uses the feedback record to select a next combination of dimension values from the dimension tables 164, that matches or succeeds the feedback record in the Cartesian space of the dimension tables 164. The DBMS 150 then generates a next active concatenated record from the selected combination of dimension values and repeats the loop using the next active concatenated record. The loop is terminated when no next combination of dimension values can be selected from the feedback record or when no feedback record can be identified.

Accordingly, by using the feedback record to zig and zag between concatenated dimension values and fact records, the DBMS 150 continually adjusts the concatenated record to be equijoined, such that fewer records are accessed relative to approaches that do not employ the feedback record. Further, by first storing the filtered records into the in-memory data store, the DBMS 150 may more efficiently move from one active concatenated record to the next, based on the feedback records. Further still, if the number of filtered records is sufficiently small such that the filtered records fit in memory, the DBMS 150 may perform random record lookups via a binary search. Otherwise, the DBMS 150 may generate an in-memory sparse flat index, such that each entry in the sparse flat index represents a segment of entries in the data store. The DBMS 150 may then perform a binary search to locate a target segment in the data store, followed by a sequential search within the target segment of the data store to locate a target dimension record.

A second approach for processing a query a query against a dimensional model may be referred to herein as a star join. To perform a star join, the DBMS 150 first joins a subset of the dimension tables 164 referenced in the query to the fact table 162, to generate what is referred to herein as a semi-join result. Each join is modeled as a nested loop join of a dimension table 164 to the fact table 162, and the fact table 162 is accessed using an index on a join key for the given dimension table 164. The DBMS 150 may then perform an index-AND operation on the record identifiers in the semi-join result. Record identifiers may also be referred to herein as row identifiers or RIDs. The index-AND operation is configured to AND together results of multiple index scans using bitmap techniques and to allow AND-ed predicates to be applied to multiple indexes, in order to reduce a count of underlying table accesses. The index-AND operation may also be referred to as an IXA operation or an IXAND operation. Because the index-AND operation may yield false positives, the DBMS 150 then performs a back join with the dimension tables. The DBMS 150 then joins in dimension tables that did not previously participate in any join, to produce query results responsive to the star schema query.

At least in some embodiments, the one-stage zigzag join accesses fact and dimension tables in an order of concatenated dimension records and may cause random I/O on data pages of the fact table. Further, the one-stage zigzag join may consume large amounts of memory in storing both dimension key value and dimension payload values in the data store. Further still, the one-stage zigzag join may perform inefficient lookups when qualified dimension records cannot fit into memory. And although the star join gathers row identifiers of records in the fact table that qualify the semi join and then retrieves the qualifying records in data page order, the star join may produce false positives and requires a potentially expensive back join operation, especially where many dimension lookups are needed as a result of the false positives.

Accordingly, a third approach is disclosed for processing a query against a dimensional model, referred to herein as a two-stage zigzag join and which includes a zigzag main join and a zigzag back join. At least in some embodiments, the two-stage zigzag join is configured to provide random access to fact and dimension tables 162, 164 efficiently and while reducing memory usage, relative to at least one of the one-stage zigzag join and the star join, and/or especially where fact records are not easily filtered by concatenated dimension values and/or where payload columns in one or more dimension are large in size or manifold in number. Thus, by using the two-stage zigzag join, the DBMS 150 may more readily generate query results in a manner that meets expectations of the requesting entity in regards to query execution time, even for complex and/or ad-hoc queries and despite resource constraints and potentially vast amounts of data being queried. The random access is provided at least in part by the data structures described above in conjunction with FIG. 1. In this regard, the data structures may also be referred to as data access structures or a data cache for the two-stage zigzag join.

In one embodiment, to perform the zigzag main join, the DBMS 150 zigs and zags between dimension keys and the fact table or fact index, accumulating all row identifiers in the fact table 162 that satisfy the join condition. After finding all qualifying row identifiers, the DBMS 150 may sort the row identifiers in data page order and optionally begin prefetching of the qualifying records of the fact table 162. Depending on the embodiment, one or more of the sorting and the commencing of the prefetching may be considered to be part of the zigzag back join rather than the zigzag main join. The sorted row identifiers are configured to facilitate subsequent retrieval of records from the fact table 162 according to the data page order, thereby improving efficiency of accessing the fact table 162. Further, in one embodiment, the zigzag main join accumulates qualifying row identifiers of the fact table and does not accumulate any dimension data. Doing so reduces the amount of memory needed to sort the row identifiers of the fact table.

In one embodiment, to perform the zigzag back join, the DBMS 150 retrieves records of the fact table based on the sorted row identifiers generated by the zigzag main join. The DBMS 150 may then reapply equijoin conditions to re-qualify the retrieved fact row in case updates have occurred ever since the row identifier of the retrieved fact row was last qualified during the zigzag main join. Further, any dimension columns specified by the query are also fetched while retrieving the fact rows, such that the joined row of dimension and fact column values are correct. Under one approach, a data manager component of the DBMS 150 returns each fact row to the query engine component of the DBMS 150, such that the query engine component can apply the equijoin to obtain the dimension columns of the query results. However, doing so results in the data manager component returning each qualified row to the join, which prevents consuming pushdown from being used by the DBMS 150. Consuming pushdown, which is further described below, refers to a technique of retrieving data from a data page of a fact table or dimension table, where the data page remains stabilized for successive read operations.

Copying data from a data page often involves first locating in main memory the data page containing a record of interest, locating the record within the data page, and locating the column values within the record. The column values may then be copied to new locations in memory for evaluation. In database systems configured to execute multiple queries concurrently, a data page may need to be "stabilized" to ensure that the data page remains in the same location in memory and to prevent concurrent updates to the data page, such that the logical integrity of the data page is preserved while the data page is being accessed by a given process or thread. After copying column values to a new location in memory, the page stabilization is ended (released). At least in some embodiments, the steps of locating the page, locating a record in the page, and releasing stabilization for each record to be processed may constitute a significant portion of the overall cost in time and/or resources of executing a query.

Accordingly, in one embodiment, data may be retrieved from a data page more efficiently by maintaining stabilization of a data page across successive read operations. For example, if a record being retrieved from a data page does not meet a query condition, a next record is retrieved from the data page while maintaining stabilization of the data page. Accordingly, multiple records may be read from the data page without releasing and reacquiring stabilization on the data page. However, if the record being retrieved from the data page does satisfy the query condition, the record is copied for processing and the stabilization on the data page is released. On the other hand, when consuming pushdown is used, a record satisfying the query condition is copied to a buffer rather than being returned directly to the query engine component, and stabilization of the data page is not yet released. At least in some cases, the efficiency gained from reducing stabilization may outweigh efficiency lost in copying data to the buffer, resulting in a net performance gain. In one embodiment, one or more components of the DBMS 150, such as the data manager component or an index manager component, may be configured to apply consuming pushdown.

Accordingly, in one embodiment, rather than returning each fact record to the query engine component of the DBMS 150 such that the query component can apply the equijoin, the DBMS 150 instead applies the equijoin as a backjoin operation using filtering applied by the data manager component on the data pages of the fact records. To facilitate the equijoin, the DBMS 150 provides random access on dimension key columns and configures the data manager component to be re-entrant in regards to the random access on dimension data, because the random access on dimension data occurs while on a fact data page. The data manager component is said to be re-entrant if the data manager component can be interrupted in the middle of its execution and then safely called again (re-entered) without its previous invocation completing execution. The components of the DBMS 150, including the data manager component and the query engine component, are further described below in conjunction with FIG. 10.

As described above, in one embodiment, the two-stage zigzag join is configured to provide random access to fact and dimension tables 162, 164 efficiently and while reducing memory usage, relative to at least one of the one-stage zigzag join and the star join. At least in some embodiments, the dimension tables are accessed in both stages of the two-stage zigzag join. In one embodiment, if the query specifies no dimension payload column and if the set of dimension records satisfying one or more query conditions in the query has an integer primary key column storing values in a densely populated range, then to provide the random access, the DBMS 150 stores the primary key values in a bitmap configured to provide sorted, random access with constant-time (O(1)) lookup without requiring sorting. In one embodiment, a dimension payload column refers to a column other than the primary key and/or the surrogate key.

On the other hand, if the query specifies at least one payload column that is required for the join or that is a desired column in the query results, then to provide the random access, the DBMS 150 buffers and sorts the primary key values in an in-memory array and stores the at least one payload column in a temporary table or index. At least in some embodiments, columns that are only specified in local predicates of the query need not be buffered or sorted. Each record in the temporary table has a unique row identifier, which is of a relatively small, predefined size that is independent of record width. The in-memory array stores a copy of each row identifier as if it were the payload corresponding to the primary key value. The DBMS 150 may then look up dimension key values via a binary search through the in-memory array and retrieve associated payloads by fetching from the temporary table or index. By storing only primary key values and row identifiers in memory, the number of (primary key, row identifier) pairs that can fit in memory is increased. When all of the pairs fit in memory, the DBMS 150 avoids incurring I/O costs from temporary table lookups or at least reduces a frequency thereof.

Further, if the in-memory array is too small to store all of the primary key values of the dimension table, then to provide the random access, the DBMS 150 creates a B-tree index over the primary key values not yet stored in the in-memory array and adopts a two-level access mechanism for sorted, random access to dimension data, which reduces or minimizes I/O from index tree lookups.

Figure 4:
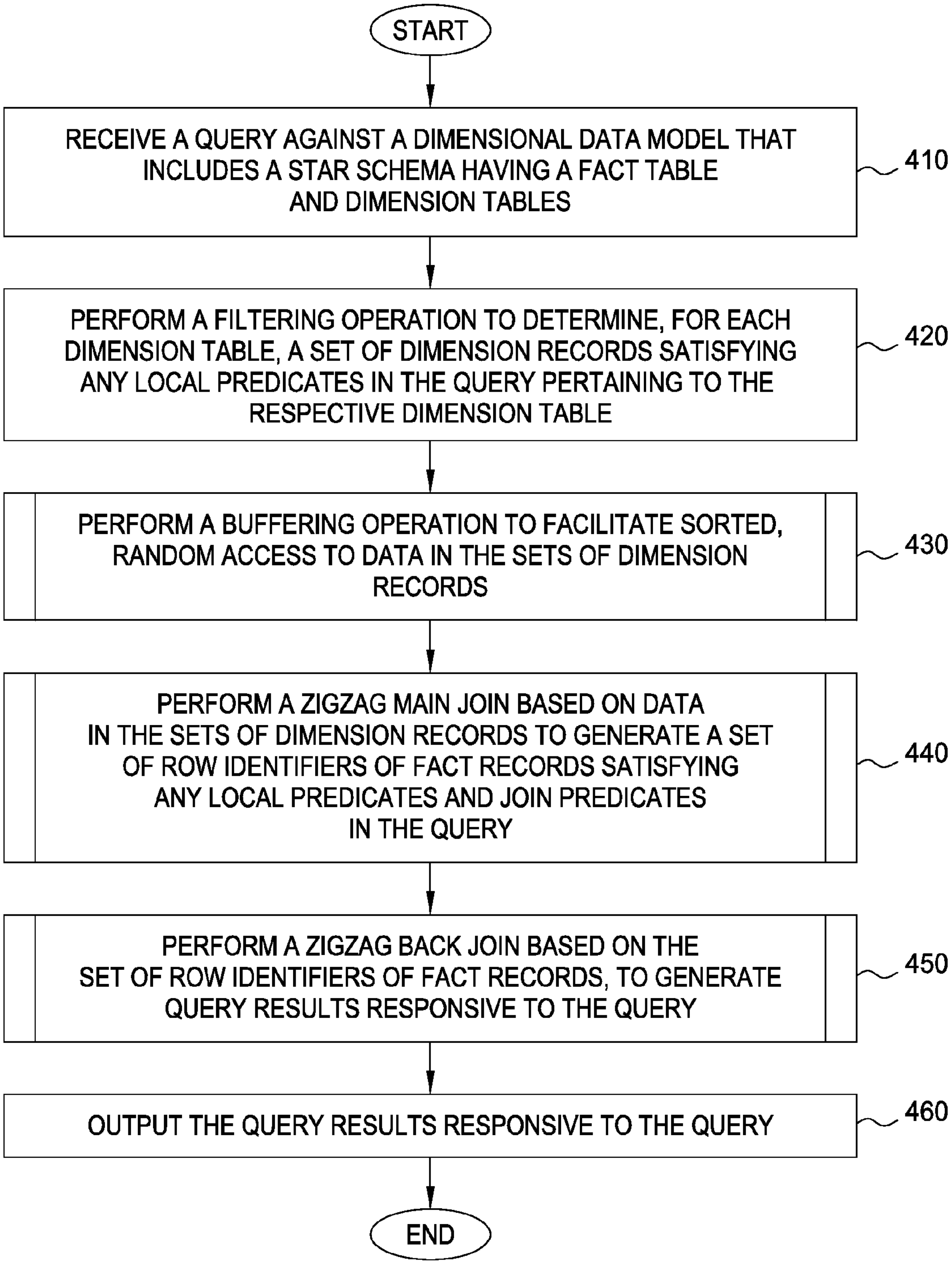
FIG. 4 is a flowchart depicting a method for accessing a dimensional model when processing a query, according to one embodiment of the invention.

FIG. 4 is a flowchart depicting a method 400 for accessing a dimensional model when processing a query, according to one embodiment of the invention. In particular, the DBMS 150 may perform the method 400 to execute a two-stage zigzag join when processing a query 152 against the dimensional model. Depending on the embodiment, a zigzag join and/or a two-stage zigzag join may—but need not necessarily—be reflected in a query execution plan generated by a query optimizer component of the DBMS 150 for the query 152. The method begins at step 410, wherein the DBMS 150 receives the query against the dimensional model. At step 420, the DBMS 150 performs a filtering operation to determine, for each dimension table 164, a set of dimension records satisfying the local predicate specified in the query for the respective dimension table 164—i.e., if any such local predicate exists. A set of dimension records so selected would satisfy (i.e., would not violate) the local predicate for the dimension table 164. At least in some embodiments, if no local predicate is specified for a given dimension table 164, then all dimension records in the dimension table 164 are added to the set, and no filtering per se is performed. At step 430, the DBMS 150 performs a buffering operation to facilitate sorted, random access to data in the sets of dimension records.

At step 440, the DBMS 150 performs a zigzag main join operation based on data in the sets of dimension records, to generate a set of row identifiers of fact records satisfying one or more query conditions from the query that pertaining to the fact table and/or dimension tables. At least in one embodiment, the set of row identifiers generated are of fact records satisfying local predicates for the fact table and local predicates for the dimension tables—i.e., if there are any such local predicates. At step 450, the DBMS 150 performs a zigzag back join operation based on the set of row identifiers, to generate query results responsive to the query 152. The steps 430, 440, 450 are further described below in conjunction with FIGS. 5-7, respectively. At step 460, the DBMS 150 outputs the query results responsive to the query 152. After the step 460, the method 400 terminates.

Figure 5:
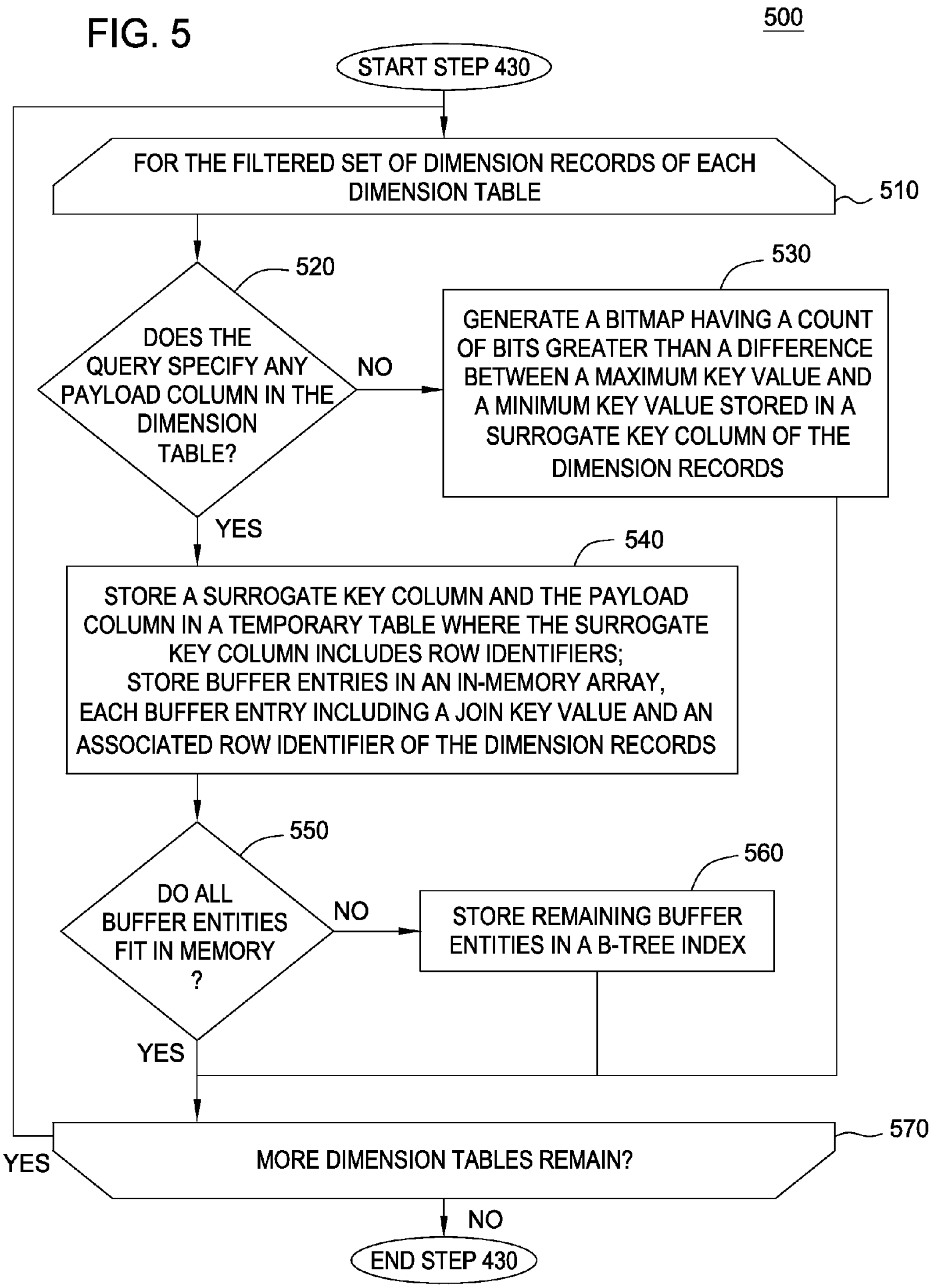
FIG. 5 is a flowchart depicting a method for performing a buffering operation to facilitate random access to dimension data, according to one embodiment of the invention.

FIG. 5 is a flowchart depicting a method 500 for performing a buffering operation to facilitate random access to dimension data, according to one embodiment of the invention. The method 500 corresponds to the step 430 of FIG. 4. At least in some embodiments, the method 500 is performed only upon determining that the dimension table stores keys in a dense range. For example, because surrogate keys are often stored in a dense range, the DBMS 150 may perform the method 500 if the dimension table includes a surrogate key column. Additionally or alternatively, the DBMS 150 may perform the method 500 if the dimension table includes a join key that is densely stored in a given range. As shown, the method 500 begins at step 510, where the DBMS 150 enters a loop to process the filtered set of dimension records of each dimension table 164. At step 520, the DBMS 150 determines whether the query specifies any payload column in the respective dimension table 164. If not, the DBMS 150 generates a bitmap having a count of bits (step 530), where the count of bits is greater than a difference between a maximum key value and a minimum key value stored in a surrogate key column of the respective dimension table 164. After generating the bitmap, the DBMS 150 determines whether more dimension tables remain to be processed (step 570).

On the other hand, if the DBMS 150 determines that the query specifies at least one payload column in the respective dimension table 164 (step 530), then the DBMS 150 stores a surrogate key column and the payload column in a temporary table 166 or temporary index (step 540). As described above, the surrogate key column stores row identifiers of the records in the respective dimension table. In an alternative embodiment, if no surrogate key column exists in the respective dimension table 164 or if the dimension records are stored on the data pages according to the primary key column, then the primary key column of the respective dimension table 164 is stored instead. In another alternative embodiment, the primary key column of the dimension table 164 may be stored in lieu of an existing surrogate key column. At the step 540, the DBMS 150 may also store buffer entries in the buffer 156.

Each buffer entry including a join key value and an associated row identifier of the dimension records.

At step 550, the DBMS 150 determines whether all the buffer entries fit in memory (step 550). If so, the DBMS 150 determines whether more dimension tables 164 remain to be processed (step 570). Otherwise, the DBMS 150 stores the remaining buffer entries in a B-tree index (step 560) before determining whether more dimension tables 164 remain to be processed (step 570). At step 570, if more dimension tables 164 remain to be processed, the method 500 loops back to the step 510 to process a next dimension table 164. Otherwise, the method 500 terminates.

Figure 6:
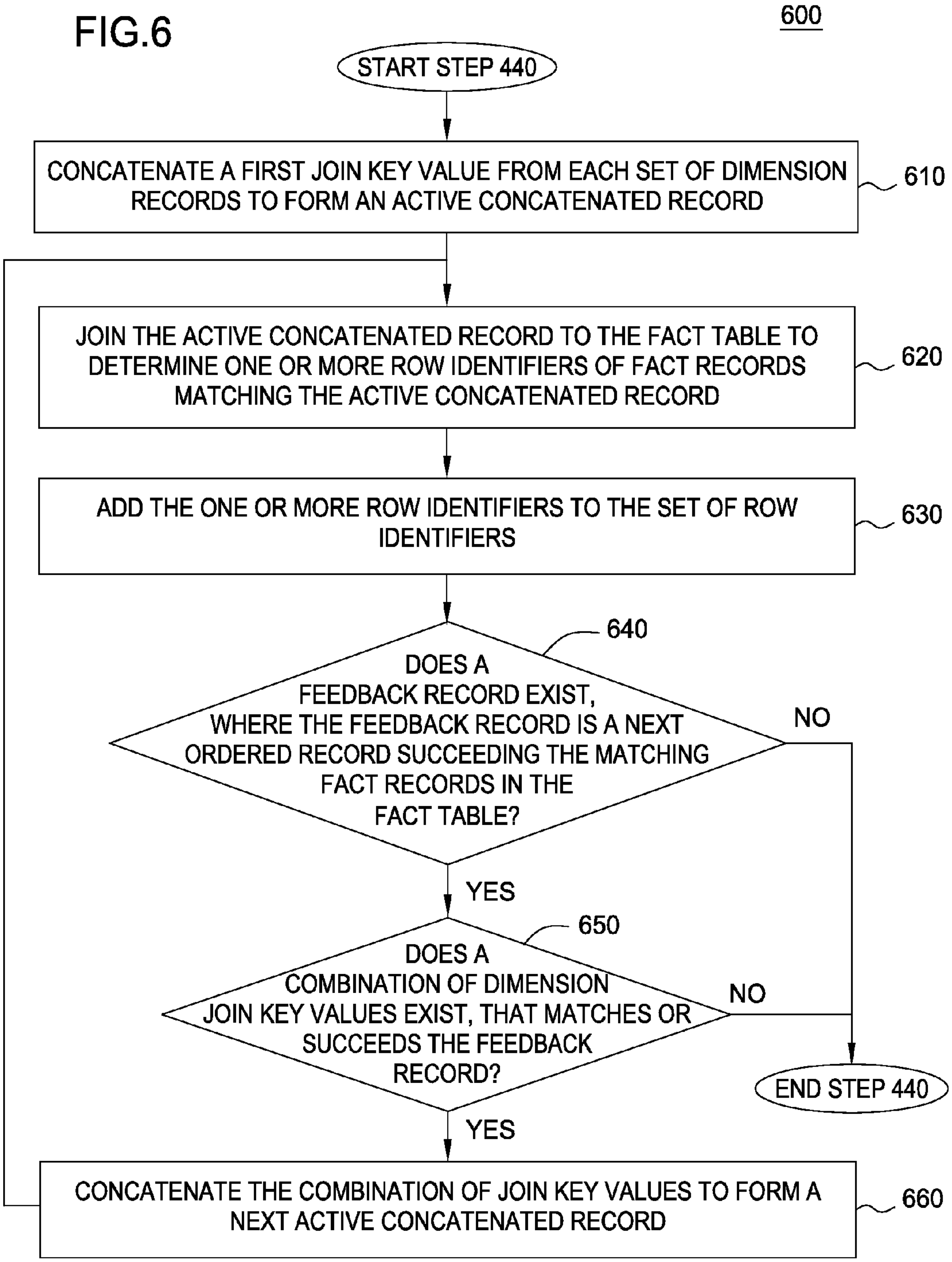
FIG. 6 is a flowchart depicting a method for performing a zigzag main join, according to one embodiment of the invention.

FIG. 6 is a flowchart depicting a method 600 for performing a zigzag main join, according to one embodiment of the invention. The method 600 corresponds to the step 440 of FIG. 4. As shown, the method 600 begins at step 610, where the DBMS 150 concatenates a first join key value from each set of dimension records to form an active concatenated record. In other words, the active concatenated record only contains join key values, unlike in one-stage zigzag join, where the active concatenated record would include other dimension columns as specified by the query. At step 620, the DBMS 150 enters a loop to join the active concatenated record to fact records selected from the fact table 162, to generate a join result that includes one or more row identifiers of fact records matching the active concatenated record and satisfying any local predicates pertaining to the fact table—unlike the join result of the one-stage zigzag join, which would include other columns of the fact table as specified by the query. If other columns of the fact table are included when the equijoin is relatively small, the data prefetching would likely not have enough rows to gain logical I/O, and if the index is not clustered, subsequent iterations through the step 620 may trigger physical I/O on a previous data page, thereby increasing the physical I/O frequency of fact data pages. At step 630, the DBMS 150 adds the one or more row identifiers to the set of row identifiers of step 440 of FIG. 4.

At step 640, the DBMS 150 determines whether a feedback record exists for the join result in the fact table. In one embodiment, the feedback record is a next ordered record succeeding the matching fact records in the fact table that are identified from the join of step 620. If so, then at step 650, the DBMS 150 determines whether a combination of join key values exists, that matches or succeeds the feedback record from step 640. If so, the DBMS 150 concatenates the combination of join key values to form a next active concatenated record (step 660) and loops back to the step 620 to process the next active concatenated record. The looping terminates if no feedback record is found (step 640) or if no combination is found of join key values of the Cartesian space, that matches or succeeds the feedback record (step 650). Unlike the one-stage zigzag join, other columns of the fact table 162 are not accessed until after all qualified row identifiers in the fact table are identified.

Figure 7:
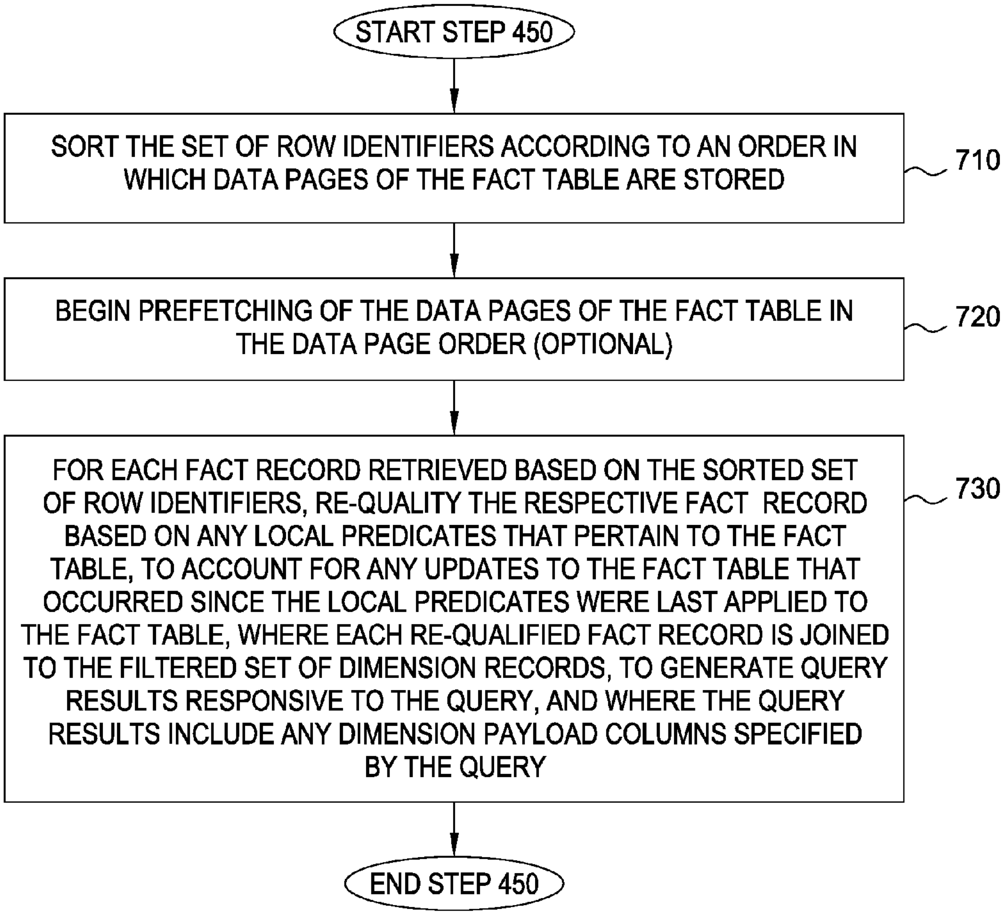
FIG. 7 is a flowchart depicting a method for performing a zigzag back join, according to one embodiment of the invention.

FIG. 7 is a flowchart depicting a method 700 for performing a zigzag back join, according to one embodiment of the invention. In this regard, the two-stage zigzag join is also unlike the one-stage zigzag join, which has no such zigzag back join stage. The method 700 corresponds to the step 450 of FIG. 4. As shown, the method 700 begins at step 710, where the DBMS 150 sorts the set of row identifiers of step 440 according to an order in which data pages of the fact table 162 are stored. At step 720, if data page prefetching is available, the DBMS 150 may optionally begin prefetching of the data pages of the fact table in the order. Doing so allows the DBMS 150 to incur logical I/O on a first row accessed from a data page, although subsequent rows accessed from the data page is likely to incur logical I/O in any event. Further, doing so for all records that qualify for the join renders the DBMS 150 to have more records to prefetch, thereby increasing the likelihood of logical I/O, and if the index is not clustered, the prefetching retrieves each data page only once, thereby reducing physical I/O. Further still, as described above, in some embodiments, one or more of steps 710 and 720 may be performed as part of the zigzag main join of FIG. 6 rather than the zigzag back join of FIG. 7.

At step 730, the DBMS 150 re-applies local predicates pertaining to the fact table 162 (rather than to the dimension tables 164) to fact records that are retrieved based on the sorted set of row identifiers. If the fact record satisfies the local predicates, then the DBMS 150 retrieves any corresponding dimension payload columns from the filtered set of dimension records, that are specified in the query, to form query results responsive to the query 152. Re-applying predicates pertaining to the fact table 162 allows the DBMS 150 to account for any updates to the fact table 162 since the predicates were last applied to the fact table 162 (e.g., at step 610 of FIG. 6). At least in some embodiments, in doing so, the DBMS 150 may apply consuming pushdown in retrieving data from the data pages of the fact records. For example, a consuming operation calling the zigzag join may apply a consuming pushdown on fact data pages of qualifying records. After the step 730, the method 700 terminates.

In one embodiment, when a dimension table that includes a surrogate key column is accessed in a star join and no payloads are needed during or after the join processing, then the DBMS 150 can generate the bitmap 154 to compactly store the surrogate key values and to provide constant-time lookups. As described above, each fact or dimension table may include a surrogate key as the primary key for the respective table, storing any candidate key that holds application data as an attribute of the respective table. Further, surrogate key values is programmatically generated within a densely populated range and do not contain any data that is meaningful per se to a user or application. In particular, if the value range of the surrogate key values of a dimension table is between X and Y, then the DBMS 150 may generate a bitmap of (Y−X+1) indexed elements to store the surrogate key values. At least in some embodiments, a relatively small unit, such as a single binary digit (bit), is used to represent each indexed element. The DBMS 150 initializes the entire bitmap to zero. Assuming the first bit in the bitmap has an index (into the bitmap) of zero, the DBMS 150 can, for a dimension surrogate key value of Z, set the bit at index (Z−X) equal to one.

In one embodiment, after all bits corresponding to the surrogate key values satisfying the query conditions are set to one, the DBMS 150 may use the bitmap for sorted, random access to data in the dimension table, as follows. To retrieve the minimum (qualifying) surrogate key value, the DBMS 150 searches for the first bit in the bitmap that is equal to one, beginning from the bit at index zero. To retrieve the maximum (qualifying) surrogate key value, the DBMS 150 searches for the last bit in the bitmap that is equal to one, starting backwards from the bit at index (Y−X+1). Assuming that the first (or last) bit is found at index I, the minimum (or maximum) surrogate key value may then be given by (X+I). To look up a surrogate key value of F that corresponds to a feedback record from the fact table, the DBMS 150 determines whether the bit at index (F−X) in the bitmap is equal to one. If so, the lookup succeeds; otherwise, the lookup fails. To retrieve the first surrogate key value succeeding the surrogate key value of F corresponding to the feedback record, the DBMS 150 searches for the first bit in the bitmap that is equal to one, beginning from the bit at index (F−X+1). Assuming that the first bit is found at index J, then the first succeeding surrogate key value is given by (X+J).

Accordingly, by generating a bitmap to store the surrogate key values of a dimension table, the DBMS 150 provides constant-time lookups without having to perform any sorting and with efficient memory utilization when the surrogate key values are densely populated. Doing so also provides re-entrant access by the data manager component during the zigzag back join stage described above. For a given portion of memory of size M bytes, suppose that the join keys are 4-byte integers. Using the one-stage zigzag join, which stores join keys in the in-memory data store, the number of keys that can fit into M bytes of memory is: M/4. Using the bitmap of the two-stage zigzag join, the number of keys that can fit into M bytes of memory is: M*8*d %, where 8 represents the number of bits per byte and d % represents a density of the key range. The bitmap stores more key values than the data store for d %>1/32.

In one embodiment, if payloads are needed during or after the join processing, the DBMS 150 buffers and sorts the join key values in the in-memory array or buffer 156 and stores corresponding payloads as a record in a temporary table 166 (or as an entry in a temporary index). Each record in the temporary table 166 has a unique row identifier having a relatively small, predefined size that is independent of payload column width. To link a join key in the buffer 156 with its corresponding payload in the temporary table 166, the DBMS 150 maintains a copy of each row identifier in the buffer 156 as the payload of its corresponding join key. In other words, each element in the array includes a join key value of the dimension table and a corresponding payload from the dimension table.

Figure 8A:
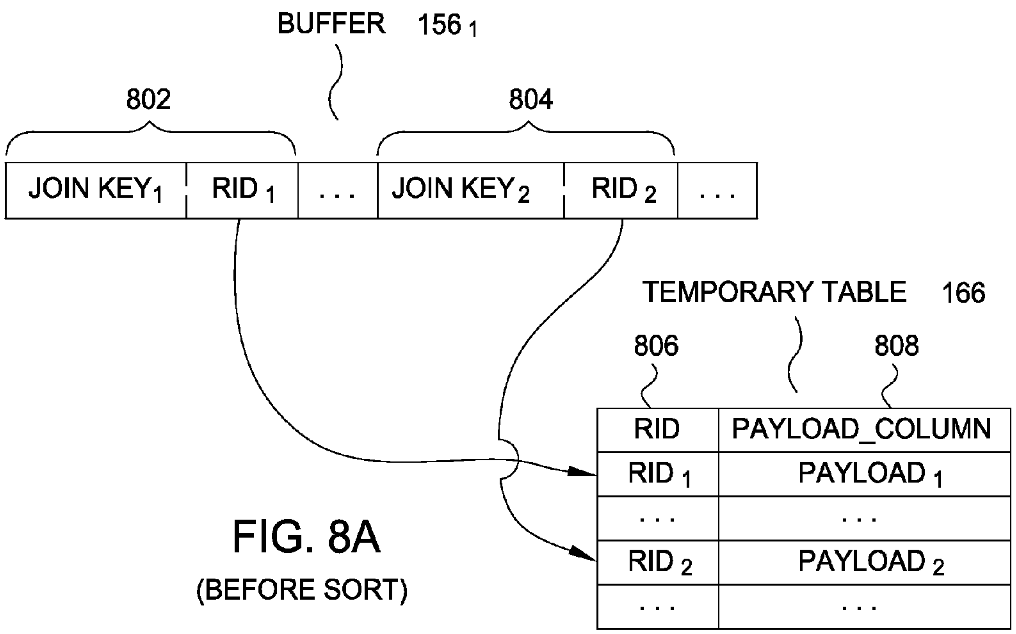
FIGS. 8A-8B illustrate an in-memory buffer and a temporary table configured to provide sorted, random access to dimension tables accessed during a two-stage zigzag join, according to one embodiment of the invention.
Figure 8B:
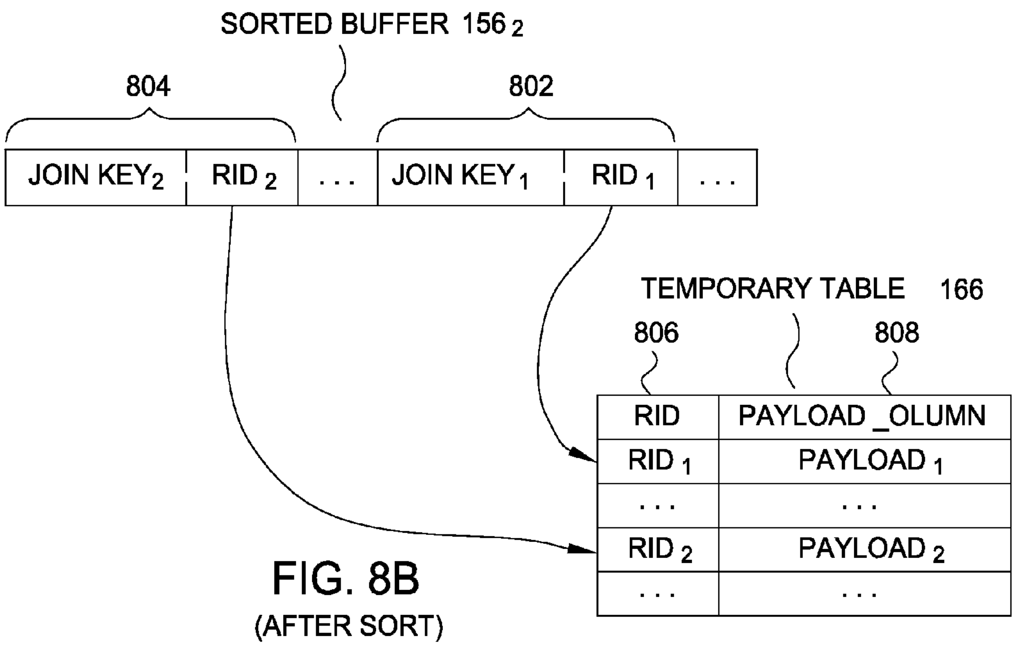

FIGS. 8A-8B illustrate the in-memory buffer 156 and the temporary table 166 configured to provide sorted, random access to dimension tables accessed during the two-stage zigzag join, according to one embodiment of the invention. As shown in FIG. 8A, before being sorted, the buffer $156_1$ includes (join key, row identifier) key pairs 802, 804 of a dimension table, in a first order. The row identifier of each key pair 802, 804 points to a corresponding entry in the temporary table 166, where the entry includes a row identifier 806 and a payload column 808.

In one embodiment, after inserting all the key pairs into the buffer 156 and storing the corresponding payloads in the temporary table 166, the DBMS 150 sorts the buffer $156_1$ on the pairs—i.e., first by join keys and then by row identifiers within each join key. Because the join key occupies the more significant bits in the key pair, the join key of each pair will be ordered relative to one another in the sorted buffer. Further, the temporary table 166 need not be sorted. As shown in FIG. 8B, after being sorted, the buffer $156_2$ includes the pairs 802, 804 of the dimension table, in a second order that is different from the first order shown in FIG. 8A. The row identifier of each pair still points to a corresponding entry in the temporary table 166, which sort order has not changed, relative to FIG. 8A. The DBMS 150 may then look up join keys from the buffer $156_2$ via a binary search and fetch corresponding payloads from the temporary table.

Accordingly, by storing only join keys and row identifiers in the buffer 156 and deferring retrieval of payloads until the zigzag back join, the DBMS 150 may perform the zigzag main join more efficiently at least in some cases. This is because the zigzag main join looks up join keys from the buffer without incurring physical I/O costs. Further, by storing payloads in the temporary table 166, the dimension access is re-entrant by the data manager component of the DBMS 150, such that the data manager component may retrieve a join key having the same value as data accessed from the filtered fact records. Further still, by storing only join keys and row identifiers in the buffer 156, the number of key pairs that can fit in a given amount of memory is increased, thereby reducing the frequency with which the temporary table is accessed. For a given amount of memory, M, suppose that the join key has size K, the payload column has size P, and the row identifier has size R. Using the one-stage zigzag join, which stores both key and payload columns in memory, the number of entries that can fit into memory is M/(K+P). Using the two-stage zigzag join, the number of entries that can fit into memory is M/(K+R). Because row identifiers are often fixed in size and payload column sizes may generally vary, it is not uncommon for a payload column to be orders of magnitude larger than a row identifier. Further, by using the two-stage zigzag join, the number of entries that can fit into memory need not depend on payload column size.

Figure 9A:
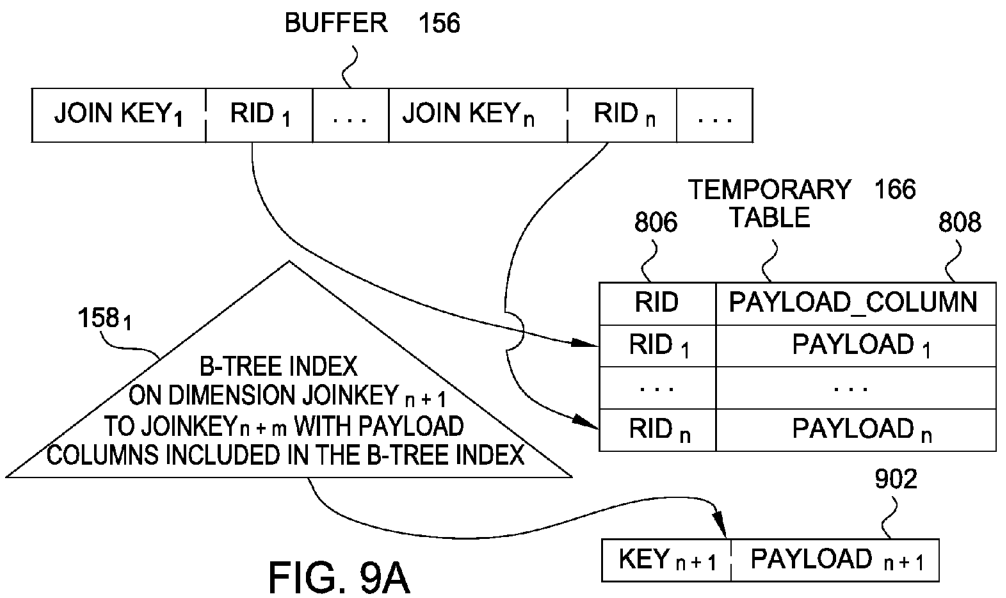
FIGS. 9A-9B illustrate a two-level access mechanism for sorted, random access to dimension tables accessed during the two-stage zigzag join, according to one embodiment of the invention.
Figure 9B:
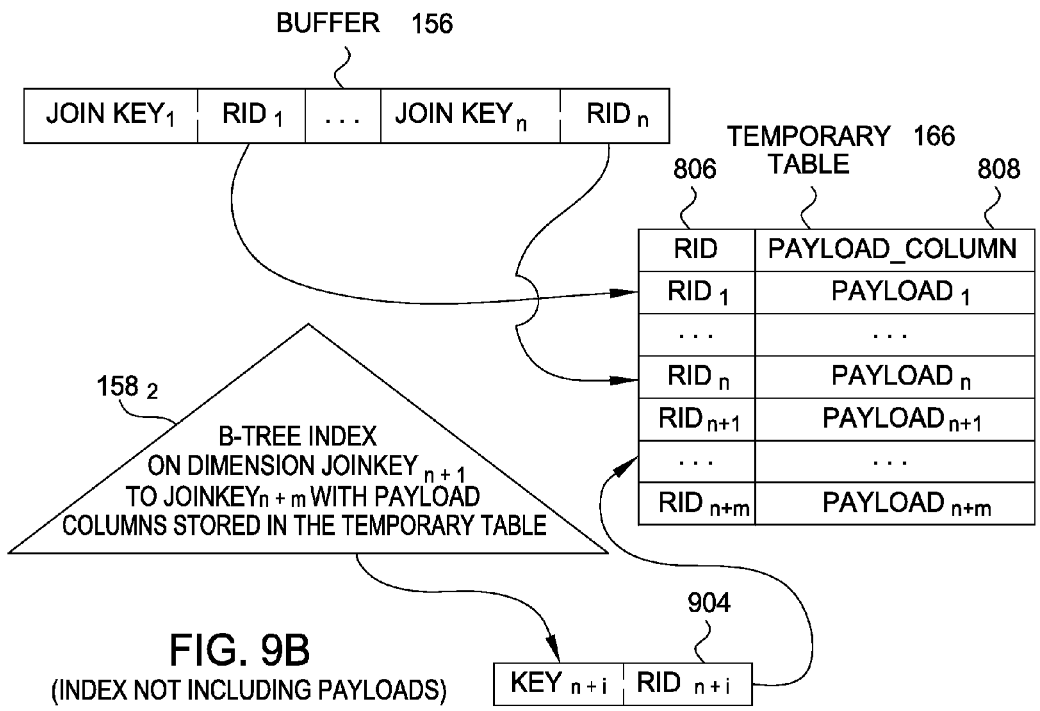

FIGS. 9A-9B illustrate the two-level access mechanism for sorted, random access to dimension tables accessed during the two-stage zigzag join, according to one embodiment of the invention. In one embodiment, if payloads are needed during or after the join processing and yet not all key pairs fit in the buffer 156, the DBMS 150 reverts to a two-level lookup mechanism for accessing dimension data. More specifically, assume that for a dimension having (n+m) key pairs, the buffer stores up to n of the key pairs. In this case, the DBMS 150 stores the n key pairs in the buffer in the manner previously described. The DBMS 150 then generates the B-tree index 158 over the remaining m key pairs. As shown in FIG. 9A, if the data type of the payload column 902 is such that the payload column 902 can be included in the B-tree index $158_1$, then the DBMS 150 includes the payload column 902 in the B-tree index $158_1$. Otherwise, as shown in FIG. 9B, the DBMS 150 stores the payload column 906 in the temporary table 166 and includes the surrogate key 904 in the B-tree index $158_2$.

Accordingly, the two-level lookup mechanism provides sorted, random access as follows. To retrieve a (qualifying) dimension record having a minimum join key value, the DBMS 150 retrieves a smallest join key value from each of the sorted buffer and the B-tree index, selecting the smaller of the two as the minimum join key value. Similarly, to retrieve a (qualifying) dimension record having a maximum join key value, the DBMS 150 retrieves a largest join key value from each of the sorted buffer and the B-tree index, selecting the larger of the two as the maximum join key value. To retrieve a dimension match for a given feedback record, the DBMS 150 performs a binary search on the buffer. If there is an exact match in the buffer, the DBMS 150 returns the matching join key and fetches its corresponding payload column from the temporary table using the row identifier. If no exact match is found in the buffer, the DBMS 150 probes the B-tree index to attempt to locate an exact match. To retrieve a succeeding dimension entry based on a given feedback record, the DBMS 150 retrieves a succeeding join key from each of the buffer and the temporary table, selecting the minimum (or maximum, depending on the sort order) of the two as the succeeding dimension entry. The DBMS 150 may then retrieve corresponding payloads from the temporary table. To access join key values without regard to payload, the DBMS 150 retrieves the join key values from the buffer and the B-tree index, without having to access any payload columns and without having to access the temporary table.

In one embodiment, by adopting the two-level lookup mechanism disclosed herein, the DBMS 150 avoids or reduces costs associated with performing sequential searches. The lookup cost associated with the two-level lookup mechanism is, in the worst case, given by O(log(n))+O(log(m)), representing a binary search of the buffer and a probe of the B-tree index, respectively. Further, keeping at least a portion of the key pairs in the buffer reduces the size of the B-tree index, which in turn reduces a frequency of incurring physical I/O when probing the B-tree index. Further still, finding an exact match in the buffer obviates the need to access the B-tree index, thereby reducing the frequency of incurring physical I/O from probing the B-tree index. Still further, by storing only join keys and row identifiers in the buffer and deferring retrieval of payloads until the zigzag back join, the DBMS 150 may perform the zigzag main join more efficiently at least in some cases. Moreover, if payloads are not specified as being needed by the query, then merely the key pairs from the buffer and/or the B-tree index may suffice for processing the query. In addition, by accessing join keys and payloads via the disclosed data access structures including the buffer, the B-tree index, and the temporary table, the dimension access is re-entrant by the data manager component of the DBMS 150, allowing the data manager component to retrieve a join key having the same value as data accessed from the filtered fact records.

Figure 10:
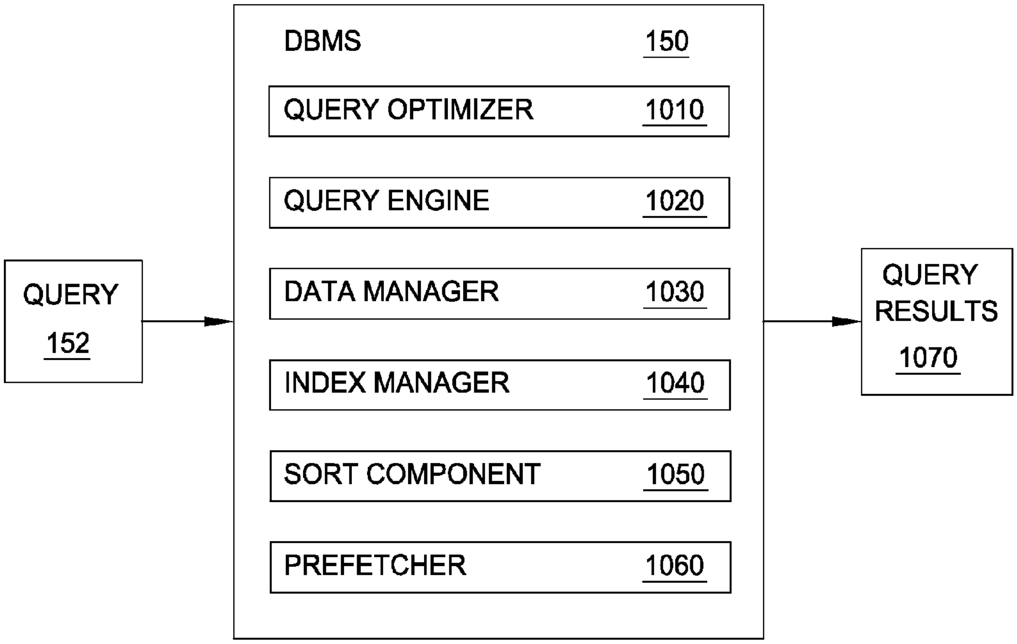
FIG. 10 is a block diagram illustrating components of a database management system (DBMS), according to one embodiment of the invention.

FIG. 10 is a block diagram illustrating components 1000 of the DBMS 150 of FIG. 1, according to one embodiment of the invention. As shown, the DBMS 150 is configured to generate query results 1070 from the query 152 and includes, without limitation, a query optimizer 1010, a query engine 1020, a data manager 1030, an index manager 1040, a sort component 1050, and a prefetcher 1060. In one embodiment, the query optimizer 1010 is configured to generate a query execution plan based on the query 152. The query engine 1020 is configured to work in conjunction with other components of the DBMS 150 to process the query execution plan to generate the query results 1070.

In one embodiment, the data manager 1030 is configured to retrieve data records that are stored in the form of one or more files stored on a storage medium such as a hard disk. Given a row identifier, the data manager 1030 serves relatively small subsets of table data from the files to a database buffer in memory, where the subsets are referred to as data pages. I/O from the file to the database buffer is referred to as physical I/O. I/O from the database buffer is referred to as logical I/O. Because buffer access is often orders of magnitude faster than file access, physical I/O is often much less desirable than logical I/O during query execution. The data manager can also apply filtering operations, such as query conditions or predicates, on records in the buffer. The data manager may be invoked via a data consuming operation. The data manager can return qualifying record by copying the records from the buffer to memory associated with the data consuming operation and return control to the data consuming operation.

In one embodiment, the index manager 1040 is configured to provide random access on tables. The index manager 1040 is configured to access an index buffer in memory and may often be implemented using a variation of a B-tree or B+-tree algorithm and/or data structure. The index manager 1040 is configured to allow an index to be defined on a table with particular key and optional non-key columns. The index manager 1040 may return records in the index key column order or in the reverse of that order by reading the index in reverse. The index manager 1040 may apply filtering operations via index keys, thereby limiting the portion of the index that is accessed. The index manager 1040 may also apply filtering operations on records in the index buffer. The index manager 1040 may be invoked by a data consuming operation. If all the requested columns are defined in the index, then the index manager 1040 may return qualifying records by copying the records from the index buffer to memory associated with the data consuming operation and return control to the data consuming operation. Because each record in an index contains a corresponding record identifier, for any given index record, columns not stored in the index may nevertheless be accessed by the data manager 1030 if needed in processing a query.

In one embodiment, the sort component 1050 is configured to sort data stored in one or more buffers associated with the DBMS 150. The prefetcher 1060 is configured to fetch table and index data prior to the data manager 1030 and/or the index manager 1040 requesting the table and/or index data. In some embodiments, the prefetcher 1060 predicts which records the data manager 1030 and/or the index manager 1040 are likely to request next, incurring costs of a physical I/O operation in advance. If a desired record is prefetched successfully by the prefetcher 1060, the data manager 1030 or index manager 1040 can access the desired record via logical I/O rather than physical I/O.

In some embodiments, to further improve efficiency with which data may be accessed, the components 1000 of the DBMS 150 may also be configured to support accessing data using RID-list-fetch. In RID-list-fetch, the data manager 1030, index manager 1040, sort component 1050, and prefetcher 1060 interoperate to improve the frequency of logical I/O on index and/or data pages. The DBMS 150 may use RID-list-fetch when an index access would filter records of a table by index keys, but the index does not contain one or more columns required for processing the query.

In one embodiment, the DBMS 150 may perform a RID-list-fetch as follows. The DBMS 150 first accesses the table via an index scan, optionally with index prefetching to incur logical I/O on the index buffers. At least in some embodiments, the index scan may often by performed with uncommitted versions of the data, to prevent the index scan from contending for row locks or constructing additional versions of the record. Because most rows tend to be committed and because uncommitted changes tend not to be committed in the end or tend not to affect results of a given query, the time and/or resource costs associated with acquiring row locks and/or constructing row versions are deferred until the data pages are being fetched. At least in some embodiments, the index filtering operation is subsequently re-applied to the fetched records.

In one embodiment, after the index scan, the DBMS 150 qualifies index records by filtering with index keys to scan only a portion of the index. The DBMS 150 then produces qualifying table row identifiers to be sorted in data page order of the table. Next, the DBMS 150 repeats the steps of qualifying index records and table row identifiers until no more records are determined to qualify. The DBMS 150 then sorts all of the qualifying record identifiers in data page order. The DBMS 150 then prefetches all the qualifying data pages in order. Next, the DBMS 150 fetches data pages using row identifiers in data page order, which incurs logical I/O for prefetched data pages. Further, even if a data page is not prefetched, subsequent rows on the data page will still incur logical I/O due to the first row on the data page having incurred physical I/O. The DBMS 150 then generates qualifying rows from the data page, repeating the fetching and generating steps until no additional row identifiers remain to be fetched.

Accordingly, embodiments of the invention provide techniques for accessing a dimensional data model when processing a query. In one embodiment, a DBMS is provided that is configured to receive the query from a requesting entity. The DBMS performs a filtering operation to determine, for each dimension table, a set of dimension records satisfying one or more conditions of the query. The DBMS then performs a buffering operation to facilitate sorted, random access to data in the sets of dimension records. The DBMS then performs a two-stage zigzag join operation that includes a zigzag main join and a zigzag back join. The zigzag main join generates a set of row identifiers of fact records satisfying one or more conditions of the query. The zigzag back join then generates query results based on the set of row identifiers, and the query results are returned responsive to the query.

In one embodiment, because the row identifiers are used during the back join to retrieve data in a data page order of the fact table, the application may access the fact table more efficiently than alternative approaches disclosed herein at least in some cases. Further, because retrieval of dimension payload columns is deferred until the back join, the application may also access the dimension tables more efficiently than the alternative approaches at least in some cases. Accordingly, by using the techniques disclosed herein, the DBMS may process queries more efficiently in terms of time and/or resources. For example, the DBMS may more readily generate query results in a manner that meets expectations of the requesting entity in regards to query execution time, even for complex and/or ad-hoc queries and despite resource constraints and potentially vast amounts of data being queried.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing a query against a dimensional data model, the dimensional data model comprising a fact table and a plurality of dimension tables, the computer-implemented method comprising:

determining, from each dimension table, a respective set of dimension records satisfying any local predicates in the query pertaining to the respective dimension table;

based on the sets of dimension records and by operation of one or more computer processors, identifying, from the fact table, a set of row identifiers of fact records satisfying any join predicates and local predicates in the query, wherein the row identifier of each fact record is identified by joining a respective, distinct, concatenated dimension record to the fact table and applying any local predicates to the fact table, wherein each concatenated dimension record is generated by concatenating a join key value from each set of dimension records, wherein the join key values for generating at least a first concatenated dimension record are determined based on a feedback record, wherein the feedback record comprises at least a portion of a next ordered fact record succeeding a previously identified fact record; and generating query results responsive to the query by joining, to the sets of dimension records, one or more fact records in the fact table selected based on the row identifiers, including performing, on a data page of the fact table, one or more predefined operations selected from a search argument processing operation, a consuming pushdown operation, and a filtering pushdown operation.

2. The computer-implemented method of claim 1, wherein retrieval of one or more dimension payload columns is deferred until generating the query results, to facilitate data retrieval from the plurality of dimension tables, wherein the set of row identifiers is sorted according to an order in which data pages of the fact table are stored, to facilitate data retrieval from the fact table, and wherein the computer-implemented method further comprises:

prior to generating the query results, prefetching at least a portion of a first data page.

3. The computer-implemented method of claim 1, wherein the query does not specify any payload column in a first dimension table, wherein the first dimension table includes a surrogate key column, wherein a payload column comprises a column other than the join key column and the surrogate key column, wherein the first dimension table stores, in the surrogate key column, a range of surrogate key values between a minimum key value and a maximum key value.

4. The computer-implemented method of claim 3, further comprising, prior to determining a respective set of dimension records from each dimension table:

generating a bitmap having a count of bits greater than a difference between the maximum key value and the minimum key value, wherein each bit represents whether any dimensional records having a corresponding join key value not violating any local predicate of the query;

wherein the bitmap is used in at least one of identifying the feedback record and joining the accessed fact records to the plurality of dimension tables.

5. The computer-implemented method of claim 1, wherein the query specifies at least one payload column in a first dimension table, wherein the first dimension table includes a key column selected from a join key column densely storing values in a value range and a surrogate key column, wherein a payload column comprises a column other than the join key column and the key column, and wherein the computer-implemented method further comprises, prior to determining a respective set of dimension records from each dimension table:

storing, in at least one of a table and an index, the key column and the payload column, wherein the key column includes a plurality of row identifiers of the first dimension table;

storing, in an in-memory array, a plurality of buffer entries, each buffer entry comprising a join key value and an associated row identifier of the first dimension table; and sorting the plurality of buffer entries in the in-memory array, without sorting any records in the table, wherein the sorted buffer entries are ordered by the join key column and the surrogate key column;

wherein the sorted buffer entries are used in at least one of identifying the feedback record and joining the accessed fact records to the plurality of dimension tables.

6. The computer-implemented method of claim 5, wherein the dimensional data model is selected from at least one of a star schema and a snowflake schema, and wherein the computer-implemented method further comprises:

generating an index for at least one join key value and associated row identifier not stored in the in-memory array, wherein the index comprises a B-tree, wherein the at least one join key value is further associated with a payload value, and wherein the associated payload value is stored in at least one of the index and the table.

7. A computer program product, comprising:

a non-transitory computer-readable medium having computer-readable program code embodied therewith for processing a query against a dimensional data model, the dimensional data model comprising a fact table and a plurality of dimension tables, the computer-readable program code executable to:

determine, from each dimension table, a respective set of dimension records satisfying any local predicates in the query pertaining to the respective dimension table;

identify, from the fact table and based on the sets of dimension records, a set of row identifiers of fact records satisfying any join predicates and local predicates in the query, wherein the row identifier of each fact record is identified by joining a respective, distinct, concatenated dimension record to the fact table and applying any local predicates to the fact table, wherein each concatenated dimension record is generated by concatenating a join key value from each set of dimension records, wherein the join key values for generating at least a first concatenated dimension record are determined based on a feedback record, wherein the feedback record comprises at least a portion of a next ordered fact record succeeding a previously identified fact record; and generate query results responsive to the query by joining, to the sets of dimension records, one or more fact records in the fact table selected based on the row identifiers, including performing, on a data page of the fact table, one or more predefined operations selected from a search argument processing operation, a consuming pushdown operation, and a filtering pushdown operation.

8. The computer program product of claim 7, wherein retrieval of one or more dimension payload columns is deferred until generating the query results, to facilitate data retrieval from the plurality of dimension tables, wherein the set of row identifiers is sorted according to an order in which data pages of the fact table are stored, to facilitate data retrieval from the fact table, and wherein the computer-readable program code is further executable to:

prior to generating the query results, prefetch at least a portion of a first data page.

9. The computer program product of claim 7, wherein the query does not specify any payload column in a first dimension table, wherein the first dimension table includes a surrogate key column, wherein a payload column comprises a column other than the join key column and the surrogate key column, wherein the first dimension table stores, in the surrogate key column, a range of surrogate key values between a minimum key value and a maximum key value.

10. The computer program product of claim 9, wherein the computer-readable program code is further executable to:

prior to determining a respective set of dimension records from each dimension table, generate a bitmap having a count of bits greater than a difference between the maximum key value and the minimum key value, wherein each bit represents whether any dimensional records having a corresponding join key value not violating any local predicate of the query, wherein the bitmap is used in at least one of identifying the feedback record and joining the accessed fact records to the plurality of dimension tables.

11. The computer program product of claim 7, wherein the query specifies at least one payload column in a first dimension table, wherein the first dimension table includes a key column selected from a join key column densely storing values in a value range and a surrogate key column, wherein a payload column comprises a column other than the join key column and the key column, and wherein the computer-readable program code is further executable to, prior to determining a respective set of dimension records from each dimension table:

store, in at least one of a table and an index, the key column and the payload column, wherein the key column includes a plurality of row identifiers of the first dimension table;

store, in an in-memory array, a plurality of buffer entries, each buffer entry comprising a join key value and an associated row identifier of the first dimension table; and sort the plurality of buffer entries in the in-memory array, without sorting any records in the table, wherein the sorted buffer entries are ordered by the join key column and the surrogate key column;

wherein the sorted buffer entries are used in at least one of identifying the feedback record and joining the accessed fact records to the plurality of dimension tables.

12. The computer program product of claim 11, wherein the dimensional data model is selected from at least one of a star schema and a snowflake schema, and wherein the computer-readable program code is further executable to:

generate an index for at least one join key value and associated row identifier not stored in the in-memory array, wherein the index comprises a B-tree, wherein the at least one join key value is further associated with a payload value, and wherein the associated payload value is stored in at least one of the index and the table.

13. A system, comprising:

one or more computer processors;

a memory containing a program, which when executed by the one or more computer processors is configured to perform an operation for processing a query against a dimensional data model, the dimensional data model comprising a fact table and a plurality of dimension tables, the operation comprising:

determining, from each dimension table, a respective set of dimension records satisfying any local predicates in the query pertaining to the respective dimension table;

from the fact table and based on the sets of dimension records, identifying, a set of row identifiers of fact records satisfying any join predicates and local predicates in the query, wherein the row identifier of each fact record is identified by joining a respective, distinct, concatenated dimension record to the fact table and applying any local predicates to the fact table, wherein each concatenated dimension record is generated by concatenating a join key value from each set of dimension records, wherein the join key values for generating at least a first concatenated dimension record are determined based on a feedback record, wherein the feedback record comprises at least a portion of a next ordered fact record succeeding a previously identified fact record; and generating query results responsive to the query by joining, to the sets of dimension records, one or more fact records in the fact table selected based on the row identifiers, including performing, on a data page of the fact table, one or more predefined operations selected from a search argument processing operation, a consuming pushdown operation, and a filtering pushdown operation.

14. The system of claim 13, wherein retrieval of one or more dimension payload columns is deferred until generating the query results, to facilitate data retrieval from the plurality of dimension tables, wherein the set of row identifiers is sorted according to an order in which data pages of the fact table are stored, to facilitate data retrieval from the fact table, and wherein the operation further comprises:

prior to generating the query results, prefetching at least a portion of a first data page.

15. The system of claim 13, wherein the query does not specify any payload column in a first dimension table, wherein the first dimension table includes a surrogate key column, wherein a payload column comprises a column other than the join key column and the surrogate key column, wherein the first dimension table stores, in the surrogate key column, a range of surrogate key values between a minimum key value and a maximum key value.

16. The system of claim 15, wherein the operation further comprises, prior to determining a respective set of dimension records from each dimension table:

generating a bitmap having a count of bits greater than a difference between the maximum key value and the minimum key value, wherein each bit represents whether any dimensional records having a corresponding join key value not violating any local predicate of the query;

wherein the bitmap is used in at least one of identifying the feedback record and joining the accessed fact records to the plurality of dimension tables.

17. The system of claim 13, wherein the query specifies at least one payload column in a first dimension table, wherein the first dimension table includes a key column selected from a join key column densely storing values in a value range and a surrogate key column, wherein a payload column comprises a column other than the join key column and the key column.

18. The system of claim 17, wherein the operation further comprises, prior to determining a respective set of dimension records from each dimension table:

storing, in at least one of a table and an index, the key column and the payload column, wherein the key column includes a plurality of row identifiers of the first dimension table; and storing, in an in-memory array, a plurality of buffer entries, each buffer entry comprising a join key value and an associated row identifier of the first dimension table.

19. The system of claim 18, wherein the operation further comprises, prior to determining a respective set of dimension records from each dimension table:

sorting the plurality of buffer entries in the in-memory array, without sorting any records in the table, wherein the sorted buffer entries are ordered by the join key column and the surrogate key column;

wherein the sorted buffer entries are used in at least one of identifying the feedback record and joining the accessed fact records to the plurality of dimension tables.

20. The system of claim 19, wherein the dimensional data model is selected from at least one of a star schema and a snowflake schema, wherein the operation further comprises:

generating an index for at least one join key value and associated row identifier not stored in the in-memory array, wherein the index comprises a B-tree, wherein the at least one join key value is further associated with a payload value, and wherein the associated payload value is stored in at least one of the index and the table;

wherein in respective instances, each of the search argument processing operation, the consuming pushdown operation, and the filtering pushdown operation is performed on a respective data page of the fact table.

* * * * *